United States Patent [19]

Sudhakar et al.

[11] Patent Number: 5,462,651

[45] Date of Patent: Oct. 31, 1995

[54] HYDRODEAROMATIZATION OF HYDROCARBON OILS USING NOVEL "PHOSPHORUS TREATED CARBON" SUPPORTED METAL SULFIDE CATALYSTS

[75] Inventors: Chakka Sudhakar, Wappingers Falls; Frank Dolfinger, Jr., Poughkeepsie; Max R. Cesar, Newburgh; Mahendra S. Patel, Hopewell Junction; Paul O. Fritz, Newburgh, all of N.Y.

[73] Assignee: Texaco Inc., White Plains, N.Y.

[21] Appl. No.: 287,979

[22] Filed: Aug. 9, 1994

[51] Int. Cl.[6] .................................................. C10G 45/46
[52] U.S. Cl. ............................. 208/143; 208/216 PP; 208/254 H; 208/213; 585/266
[58] Field of Search ................ 208/216 R, 138, 208/216 PP; 502/182–185

[56] References Cited

U.S. PATENT DOCUMENTS

| | | | |
|---|---|---|---|
| 3,812,028 | 5/1974 | Wennerberg et al. | 208/112 |
| 3,997,473 | 12/1976 | Schmitt et al. | 208/216 |
| 4,032,435 | 6/1977 | Schmitt et al. | 208/216 |
| 4,082,652 | 4/1978 | Voorhies | 208/216 |
| 4,176,267 | 11/1974 | Ternan et al. | 208/112 |
| 4,313,852 | 2/1982 | Gavin et al. | 252/439 |
| 4,483,767 | 11/1984 | Antos et al. | 208/138 |
| 4,525,267 | 6/1985 | Inooka | 208/110 |
| 4,831,003 | 5/1989 | Lang et al. | 502/183 |
| 5,051,389 | 9/1981 | Lang et al. | 502/185 |

*Primary Examiner*—Helane Myers
*Attorney, Agent, or Firm*—James L. Bailey; Kenneth R. Priem; Cynthia L. Hunter

[57] ABSTRACT

A process for simultaneous hydrodearomatization, hydrodesulfurization and hydrodenitrogenation of a charge hydrocarbon oil containing undesired aromatic components, sulfur and nitrogen compounds, which comprises:

maintaining a bed of a sulfided metal catalyst comprising one or more metals of non-noble Group VIII, at least one metal selected from tungsten and molybdenum on a novel "phosphorus treated carbon" support, the "phosphorus treated carbon" support being comprised of phosphorus bound to the carbon surface predominantly as polyphosphate species characterized by peaks between −5 and −30 ppm in the solid-state magic angle spinning $^{31}P$ nuclear magnetic resonance spectrum;

passing a charge hydrocarbon feed in the presence of hydrogen into contact with said catalyst at hydrotreating conditions, thereby effecting hydrodearomatization, and simultaneously effecting hydrodesulfurization and hydrodenitrogenation.

20 Claims, No Drawings

HYDRODEAROMATIZATION OF HYDROCARBON OILS USING NOVEL "PHOSPHORUS TREATED CARBON" SUPPORTED METAL SULFIDE CATALYSTS

FIELD OF THE INVENTION

This application is related to U.S. applications Ser. No. 08.287,738.

This invention relates to a hydroprocessing catalyst composition comprising Group VIB and Group VIII metal sulfides on a novel "phosphorus treated carbon" support, useful for hydrodesulfurization, hydrodenitrogenation, hydrodeoxygenation, hydrodearomatization, hydrocracking, hydrogenation, hydrofining, hydrodemetallization, and other hydroprocessing reactions such as improving the hydrogen to carbon ratio, API gravity, color etc. of hydrocarbon oils. More particularly, the novel "phosphorus treated carbon" support of the catalysts of the present invention is prepared by mixing activated carbon and phosphorus-based compounds and heat treating the resultant mixture at high temperature. The novel "phosphorus treated carbon" support is further characterized by phosphorus bound to the carbon surface predominantly as polyphosphate species which are characterized by peaks between −5 and −30 ppm in the solid-state magic angle spinning $^{31}P$ magnetic resonance spectrum. These novel "phosphorus treated carbon" supported [Group VIII+Group VIB] metal sulfide catalysts were found to be extremely active for the one step hydrodearomatization (HDAr) of middle distillates containing substantial concentrations of sulfur and nitrogen. These catalysts are about twice as active as the current best commercially available hydroprocessing catalysts for one step HDAr. In addition, they were found to have excellent hydrodesulfurization (HDS) and hydrodenitrogenation (HDN) activities, which are highly desirable.

This invention also relates to a process for the catalytic hydrodearomatization of middle distillates and naphthas using the "phosphorus treated carbon" supported metal sulfide catalysts, to produce low aromatics containing fuels. Substantial HDS and HDN are also simultaneously accomplished along with HDAr, which are highly desirable.

With their extremely high hydrogenation activities, these novel catalyst compositions will be very useful for hydroprocessing, hydrotreating and hydrofining of various hydrocarbon feedstocks such as naphthas, middle distillates, gas oils, vacuum gas oils and vacuum resids, derived from sources such as petroleum, coal, shale, tar sands, and oil sands in general, and for the hydrodearomatization of middle distillates for the production of low aromatics diesel fuel, kerosine and gasoline, in particular.

BACKGROUND OF THE INVENTION

Aromatic hydrocarbons in fuels such as gasoline or diesel oil represent a source of atmospheric pollution. The aromatic content of middle distillates may be as high as 85 vol %. An illustrative light straight run gas oil may, for example, typically contain 30 vol % aromatics. As environmental considerations become of greater concern, it is desirable to treat hydrocarbons such as naphthas and middle distillate hydrocarbons to decrease the content of undesirable aromatic components. Noble metal catalysts, which are excellent for aromatics saturation will quickly get poisoned by the sulfur and nitrogen compounds that are present in typical hydrocarbon feedstocks, and lose their activity. Therefore, noble metal catalysts can not be used for a one-step process for hydrodearomatizing these fuel feedstocks. Since the prior art hydroprocessing catalysts, typified by sulfided alumina supported cobalt/nickel/molybdenum/tungsten, sometimes promoted by phosphorus or fluorine, do not have the catalytic activities necessary for producing a product having a very low aromatic content, it is desirable to find a hydrotreating catalyst with very high aromatics saturation activity.

U.S. Pat. No. 1,965,956 is directed to the hydrogenation of aromatic compounds to hydroaromatic compounds with a gas consisting substantially of hydrogen under a pressure of at least 100 atmospheres, at a temperature between 200° C. and 350° C., in the presence of a "mixed catalyst" comprising metal compounds of Group 1, Group 6 and Group 8 of the periodic system, on a wide variety of catalyst supports including active charcoal. The catalysts of U.S. Pat. No. 1,965,956 can also contain "activating admixture" selected from compounds of elements of Groups 2 to 5 and of Group 7 of the periodic system.

U.S. Pat. No. 2,608,521 is directed to a process for the desulfurization of "sulfur bearing" hydrocarbon oils using "sulfactive hydrogenation catalysts". The "sulfactive hydrogenation catalysts" of U.S. Pat. No. 2,608,521 can consist of "oxides or sulfides of the transition metals", with or without such stabilizers and promoters as the oxides and carbonates of a very large selection of metals, in combination with a large selection of various conventional support materials.

U.S. Pat. No. 3,367,862 is directed to desulfurization of heavy residual hydrocarbons by hydrolysis with water in the presence of catalyst on a charcoal base.

U.S. Pat. No. 3,546,103 is directed to the removal of metals and coke from hydrocarbon resids by use of, as pre-catalyst, metals of Group IIB or Group VIB plus Group VIII, on charcoal.

U.S. Pat. No. 3,725,303 is directed to treating of aqueous solutions of oxy-sulfur compounds (such as sodium thiosulfate) by use of a catalyst containing molybdenum sulfide and cobalt sulfide on a carbon support.

U.S. Pat. No. 3,812,028 is directed specifically to "hydrotreating" fossil fuels containing polynuclear aromatics such as asphaltenes, for converting the components boiling above 1000° F. to products boiling below 1,000° F. (this is actually hydrocracking), by the use of Group VI and/or Group VIII metals on carbon, at a hydrogen partial pressure in excess of 2,200 psig and at a temperature between 750° F. and 850° F.

U.S. Pat. No. 3,997,473 (and its divisional U.S. Pat. No. 4,032,435) is directed to hydrodesulfurization of petroleum residues by use of a catalyst comprising cobalt/nickel/molybdenum/tungsten on a carbon support, the carbon support being characterized by an average pore radius of at least 25 Angstroms and a BET Surface area of 200–800 m²/g. The catalyst of these patents has a loading of Group VIB metal "of at least 10 and up to about 20 weight percent expressed as metal oxide based on the weight of the catalyst support."

U.S. Pat. No. 4,082,652 is directed to treatment of heavy oils, to effect hydrodesulfurization by use of a molybdenum/nickel or molybdenum/cobalt on carbon catalyst. The catalyst preparation requires that the molybdenum be deposited first, then sulfided, and only then that the nickel or cobalt be added.

U.S. Pat. No. 4,176,051 is directed to a process for catalytically hydrocracking a heavy hydrocarbon oil, wherein the heavy hydrocarbon oil is slurried with a particulate catalyst mass comprising "aluminum compound coated coal and/or coke particles" which may also be coated with a cobalt and/or a molybdenum compound, and then reacted with hydrogen.

U.S. Pat. No. 4,313,852 is directed to hydrotreating, particularly of coal liquids, in the presence of a sulfided molybdenum or tungsten on active carbon, with or without a second metallic component, in which catalysts the metal sulfides are substantially completely on the outer surface of the active carbon support. The carbon supported catalyst preparation according to U.S. Pat. No. 4,313,852 must involve direct deposition of metal sulfides on the carbon support and subsequent reduction to lower valent sulfides.

U.S. Pat. No. 4,831,003 is directed to a catalyst composition, useful in hydrotreating processes, prepared by depositing a compound of a metal of Group IIB, IVB, IVA, VA, VIA, VIIA, or VIIIA onto a carbon support formed simultaneously with the deposition, by partial combustion of an unsaturated hydrocarbon. The deposited metal is thereafter converted to an oxide or sulfide.

U.S. Pat. No. 5,051,389 is directed to a method for preparing a catalyst composition for hydroconversion processes wherein the catalyst composition is formed by depositing one or more metal and/or metal compounds from vapor phase, at elevated temperatures, onto a preformed carbon support which has maximum dimension in any direction of about 50 Angstroms to about 5,000 Angstroms. The catalysts made according to U.S. Pat. No. 5,051,389 have to be added to or combined with the carbonaceous material to be hydrotreated in only 50 to 5,000 parts per million concentration, for the hydroconversion process to take place (one-pass application).

There is a continuing need in the art for catalysts which demonstrate improved hydrodearomatization of middle distillate hydrocarbons. It would be extremely valuable if a catalyst which performed better with respect to hydrodearomatization were capable of simultaneously eliminating sulfur and nitrogen.

SUMMARY OF THE INVENTION

In accordance with certain of its aspects, this invention is directed to a process for treating a charge hydrocarbon such as a naphtha or middle distillate hydrocarbon containing undesired aromatic components, sulfur and nitrogen compounds, which comprises:

maintaining a bed of metal sulfide catalyst comprising a non-noble metal of Group VIII and a metal of VIB on a "phosphorus treated carbon" support, the "phosphorus treated carbon" support having been prepared by heat treating mixtures of activated carbon and phosphorus compounds at temperatures greater than 450° C., and the "phosphorus treated carbon" support further characterized by the phosphorus existing predominantly as polyphosphate species bound to the carbon surface characterized by peaks between −5 and −30 ppm in the solid-state magic angle spinning $^{31}P$ nuclear magnetic resonance spectrum, passing a charge hydrocarbon in the presence of hydrogen into contact with said metal sulfide catalyst containing a non-noble metal of Group VIII and a metal of Group VIB on a "phosphorus treated carbon" support at hydrotreating conditions thereby effecting hydrodearomatization, hydrodesulfurization, and hydrodenitrogenation of said charge hydrocarbon containing undesired aromatic components, sulfur and nitrogen compounds, forming a product stream of hydrocarbon containing lesser quantities of undesired aromatic components, sulfur and nitrogen; and recovering said product stream of hydrocarbon containing lesser quantities of undesired aromatic components, sulfur and nitrogen.

DESCRIPTION OF THE INVENTION

The charge hydrocarbons which may be treated by the process of this invention include those which are commonly designated as naphthas, middle distillates or other heavier hydrocarbon feedstocks such as gas oils, vacuum gas oils, residua, shale oils, coal liquids, sand oils, etc. Naphthas, middle distillates and gas oils produced from fluid catalytic crackers, steam crackers and delayed cokers, which are sometimes called cracked feedstocks are also included as charge hydrocarbons for this invention. Typically naphthas may have an initial boiling point (IBP) of at least about 70° F. and typically 80° F.–200° F. by ASTM distillation #D86. The charge middle distillates may have an IBP of at least about 300° F., and commonly about 300° F.–480° F.

These charge hydrocarbons may include naphtha (IBP of 70° F.–200° F.), kerosene (IBP of 300° F.–340° F.), light gas oil (IBP of 340° F.–480° F.), etc.

Many of these charge middle distillates may have an aromatic content as high as 80 vol %, typically 20 vol %–50 vol %, say 25 vol %–40 vol %. In addition to the undesired aromatic components, they may contain other undesirables such as sulfur (0.1 wt %–5 wt %, typically 1 wt %–4 wt %) and nitrogen (10–5,000 wppm, typically 0.001%–0.2 wt %).

A typical charge which may be treated by the process of this invention may be a light atmospheric gas oil (LAGO) having the following properties:

TABLE

| Property | Value |
| --- | --- |
| API Gravity | 32° |
| ASTM D86 Distillation: | |
| IBP °C. | 197 |
| 10% °C. | 263 |
| 50% °C. | 299 |
| 90% °C. | 344 |
| EP (End Point) °C. | 360 |
| Sulfur wt % | 0.71 |
| Nitrogen wppm | 500 |
| Aromatics wt % (ASTM D-5186) | 32 |

In practice of the process of this invention, the charge may be admitted to the catalyst bed at about 200° C.–450° C., preferably at 300° C.–410° C., say about 380° C., and 200–3,000 psig, preferably 400–2,500 psig, say 1,500 psig. Hydrogen is admitted at a flow rate of 200–10,000 SCFB, preferably 1,000–6,000 SCFB, say about 4,000 SCFB. Gas mixtures wherein hydrogen is the major component, say higher than about 60% by volume, may be employed instead of pure hydrogen gas. LHSV based on catalyst volume may be 0.1–10, preferably 0.5–4, say about 2.5. The process of the present invention may be effected in a fixed bed reactor system, ebullated bed reactor system, fluidized bed reactor system, slurry reactor system, or in a flow through system where the catalyst as powder or granules is slurried with the hydrocarbon feed and sent through a reactor (once through operation). For naphthas and middle distillates, it is preferred to use extrudates, pellets, spheres or granules of the catalyst in a fixed bed reactor system.

The "phosphorus treated carbon" support of the catalysts of the present invention is preferably prepared using an activated carbon precursor or starting material. All carbons with B.E.T. surface areas more than 100 m$^2$/g, derived from raw materials such as coal, wood, peat, lignite, coconut shell, olive pits, synthetic polymers, coke, petroleum pitch, coal tar pitch, etc., existing in any physical form such as powder, pellets, granules, extrudates, fibers, monoliths, spheres, and the like are suitable as precursors for preparing the instant "phosphorus treated carbon" support. Granulated carbon blacks may also be employed as precursors. The activated carbon starting material can contain small concentrations of phosphorus (on the order of about 1% by weight), or can be phosphorus free.

The "phosphorus treated carbon" support of the catalysts of the present invention is prepared by incorporating one or more of inorganic, organic or organometallic phosphorus compounds such as ammonium phosphates, alkyl phosphates, urea phosphate, phosphoric acid, and phosphorus pentoxide into the activated carbon starting material. Addition by impregnation of the activated carbon with solution can be carried out by dissolving the phosphorus based compound and impregnating the carbon. Alternatively, the carbon material can be thoroughly mixed with the phosphorus-based compound in a solid or slurry state. Phosphorus can also be introduced into the carbon through vapor or gas phase, using suitable phosphorus compounds, at appropriate conditions. The activated carbon/phosphorus compound mixture is subjected to a heat treatment after impregnation. The heat treatment step requires subjecting the activated carbon/phosphorus compound mixture to a temperature from about 450° to about 1200° C. This heat treatment is considered critical as it is believed to convert most of the phosphorus to polyphosphate species bound to the carbon surface, which show characteristic peaks between −5 and −30 ppm in their $^{31}$P magic angle spinning solid-state nuclear magnetic resonance spectrum. The peaks due to these phosphorus species also have characteristic spinning side-bands due to a large chemical shift anisotropy.

The Total Surface Area (Brunauer-Emmett-Teller, BET) of the "phosphorus treated carbon" support should be at least about 100 m$^2$/g, and typically between 600 m$^2$/g and 2000 m$^2$/g. The Total Pore Volume (TPV) for nitrogen is at least about 0.3 cc/g, preferably 0.4–1.2 cc/g, say 0.8 cc/g. The Average Pore Diameter by nitrogen physisorption, is in the range of 12–100 Angstroms, preferably 16–50 Angstroms, say 30 l. Preferably 20–80% of the total pore volume of the "phosphorus treated carbon" support should exist in pores in the mesopore range (20–500 Å diameter). The "phosphorus treated carbon" support used to prepare the catalysts of the present invention can exist in any physical form including, but not limited to powder, granules, pellets, spheres, fibers, monoliths, or extrudates. It may also contain inert refractory inorganic oxides as minor components, the total of these minor components being less than about 20 wt. %. The phosphorus level in the "phosphorus treated carbon" support of the catalysts of the present invention may range from about 0.1% to 10% by weight, measured as elemental phosphorus. The preferred range is between 2.5% and 10% phosphorus by weight in the support.

The desired hydrodearomatization of hydrocarbons is accomplished using the novel "phosphorus treated carbon" supports having deposited thereon 1–50 wt % of Group VIB and 0.1–15 wt % of non-noble Group VIII metal, calculated as elemental metals, based on the final catalyst weight. The catalysts of the present invention can also contain additional promoters such as boron and fluorine, at 0.01% to 4% by weight, calculated as elemental boron or fluorine, based on the total catalyst weight.

The catalytic metals may be deposited on the "phosphorus treated carbon" in the form of inorganic, organic or organometallic compounds of the metals, either sequentially or simultaneously, by various processes including incipient wetness impregnation, equilibrium adsorption etc., from aqueous or non-aqueous media, or from vapor phase using volatile compounds of the metals. The catalysts can also be prepared by solid state synthesis techniques such as, for example, grinding together the support and the metal compounds in a single step or in multiple steps, with suitable heat treatments.

It is to be noted that Cr, Mo, W, Ni, Fe and Co exist as oxides or as partially decomposed metal compounds which are precursors to the oxides in the prepared catalysts. All the metals can be deposited in any order on the carrier (support), either in a single step or in multiple steps via solid state techniques or solution impregnation from aqueous or non-aqueous media, with heat treatment in between.

The chromium and/or molybdenum together can constitute from 1 to 20% by weight, calculated as elemental chromium or molybdenum, based on the final catalyst weight. The preferred range is 5–18% by wt., say about 12% by weight. The tungsten can constitute 1–50% by wt., preferably 10–45% by weight, say about 37% wt %, calculated as elemental tungsten, based on the final catalyst weight. Tungsten is the preferred Group VIB metal.

The non-noble Group VIII metal may preferably be one or more metals selected from cobalt, iron or nickel. The catalyst can constitute 0.1–15% by weight selected from one or more of nickel, cobalt and iron. The preferred range for one or more metals selected from nickel, iron or cobalt is from 2 to 10% by wt., say about 7 wt. %, calculated as elemental Group VIII metal, based on the final catalyst weight. Nickel is the preferred Group VIII metal.

The Group VIB metal may be loaded onto the catalyst support preferably from an aqueous solution of ammonium heptamolybdate or of ammonium metatungstate. The Group VIII non-noble metal may be loaded onto the catalyst support preferably from an aqueous solution of nickel nitrate hexahydrate or cobalt nitrate hexahydrate.

In a preferred embodiment, the novel "phosphorus treated carbon" support containing the polyphosphate species is contacted with an aqueous solution of a salt of a Group VIB metal, preferably ammonium metatungstate, (NH$_4$)$_6$H$_2$W$_{12}$O$_{40}$ in an amount to fill the pores to incipient wetness. The "phosphorus treated carbon" support bearing the Group VIB metals is typically allowed to stand at room temperature for 0.5–4 hours, say 2 hours, and then heated in air or inert atmosphere at a rate of 0.3° C./min to 115° C., maintained at that temperature for 12–48 hours, say 24 hours, and then cooled to room temperature over 2–6 hours, say 3 hours. Higher temperatures of up to 500° C. can be utilized. Multiple impregnations may be employed to prepare catalysts with desired Group VIB metal loading.

Thereafter the support bearing the Group VIB metal is contacted with aqueous solution of the non-noble Group VIII metal, preferably nickel nitrate hexahydrate, in amount to fill the pores to incipient wetness. The "phosphorus treated carbon" support bearing Group VIB metal and Group VIII metal is typically allowed to stand at room temperature for 0.5–4 hours, say 2 hours, and then heated in air or inert atmosphere, at a rate of 0.3° C./min to 115° C., maintained at that temperature for 12–48 hours, say 24 hours and then cooled to room temperature over 2–6 hours, say 3 hours.

Higher temperatures up to 500° C. can be utilized. Multiple impregnations may be employed to prepare catalysts with desired Group VIII metal loading.

The catalyst so prepared contains 1–50 wt %, preferably 5–18 wt %, say 12 wt %, of molybdenum or chromium of Group VIB (measured as metal); 0.1–15 wt %, preferably 2–12 wt %, say 7 wt %, of Group VIII metal (measured as metal); supported on the novel "phosphorus treated carbon" support. When the VIB metal is the preferred tungsten, it may be present in amount of 1–50 wt %, preferably 10–45 wt %, say 37 wt %, calculated as elemental tungsten, based on the final catalyst weight.

In a typical process according to the present invention, the Group VIB and non-noble Group VIII metal catalyst supported on the "phosphorus treated carbon" support is loaded into a hydrotreating reactor and sulfided in situ to convert the Mo/W and Ni/Co/Fe compounds to their respective sulfides to a significant extent.

The sulfiding can be accomplished using any method known in the art such as, for example, heating in a stream of hydrogen sulfide in hydrogen or by flowing an easily decomposable sulfur compound such as carbon disulfide, dimethyl disulfide or di-t-nonyl polysulfide, in a hydrocarbon solvent, over the catalyst at elevated temperatures up to, but not limited to 450° C. at atmospheric or higher pressures, in the presence of hydrogen gas for 2–24 hours, say 3 hours.

Alternatively, the sulfiding can also be effected by the sulfur compounds present in the hydrocarbon feed itself which is being hydrotreated. The catalyst can also be pre-sulfided outside the reactor, suitably passivated and then loaded into the reactor. After sulfiding, the petroleum fraction is passed through the catalyst bed together with hydrogen gas at pressures ranging from 200–3000 psi and temperatures ranging from 200–450° C. at liquid hourly space velocities (LHSV) ranging from 0.1 to 10. Pure hydrogen gas or recycle gas containing largely hydrogen can be used at flow rates ranging from 200–10000 SCFB.

Ex-situ sulfiding can be accomplished using any of the known techniques described in literature. If a sufficient amount of sulfur is incorporated into the catalyst using one of these ex-situ presulfiding techniques, activation of the catalyst might be accomplished by heating the catalyst in hydrogen flow in the reactor itself.

Practice of the process of this invention will be apparent to those skilled in the art from the following wherein all parts are parts by weight unless otherwise stated. An asterisk (*) indicates a control example.

"Phosphorus treated carbon" materials designated as Carbon-B, Carbon-C, Carbon-D, and Carbon-E, which are used as catalyst supports to prepare the novel catalysts of the present invention, were prepared using the procedure described above in general, employing a commercially available activated carbon as the starting material or precursor. The actual preparation involved essentially depositing an aqueous solution of phosphoric acid containing the required amount of phosphorus to obtain a certain phosphorus content in the final "phosphorus treated carbon", on the commercially available activated carbon pellets called NUCHAR BX, from Westvaco, drying the impregnated pellets in air to remove the water, then heat treating the dried pellets in an inert oxygen free atmosphere at temperatures between 760° C. and 870° C.

Carbon-A, which is used as catalyst support for preparing the comparative example catalyst, is the commercially available BX-7530 carbon from Westvaco. The BX-7530 carbon, as obtained from the manufacturer, contained some phosphorus (1.13% by weight).

The properties of all the "phosphorus treated carbon" supports, and of the BX-7530 carbon designated as Carbon-A are presented in the following table-1.

TABLE 1

Properties of "Phosphorus treated carbon" materials, and of Carbon-A (Comparative example), used as catalyst supports.

| Catalyst Support | BET Surface Area ($m^2/g$) | Pore volume for $N_2$ (ml/g) | Phosphorus Content (wt. %) |
|---|---|---|---|
| Carbon-A (Comparative) | 1087 | 0.76 | 1.1 |
| Carbon-B | 1020 | 0.82 | 5.8 |
| Carbon-C | 1160 | 0.76 | 4.0 |
| Carbon-D | 1100 | 0.72 | 5.3 |
| Carbon-E | 1087 | 0.78 | 5.6 |

For all catalyst preparations, support materials were ground to 20–40 mesh particles, and were used to prepare the catalysts.

EXAMPLE 1* (Comparative Example)

Preparation of Ni—W/Carbon-A catalyst (Catalyst C1)

Step 1

45.5 parts of ammonium metatungstate (AMT) $(NH_4)_6H_2W_{12}O_{40}$ was dissolved in 39.5 parts of fresh deionized water. 40 parts of Carbon-A was impregnated with this solution to incipient wetness. The impregnated material was left at room temperature with occasional stirring for 2 hours. It was then heated slowly at a rate of 0.3° C./min to 115° C. in an oven in air, was left at that temperature for 24 hours and was cooled slowly to room temperature in 3 hours.
Step 2:

The material from Step 1 above was impregnated to incipient wetness with a solution made up of 33.1 parts of Ni nitrate in 19 parts of deionized water. The impregnated material was heat-treated in the same way as in Step 1.

The resulting material is referred to as Catalyst C1. If all the AMT and Ni nitrate had decomposed to the respective oxides, Catalyst C1 would contain nominally 37% by weight W and 7.5% by weight Ni, the balance being the support carbon-A.

EXAMPLE 2

Preparation of Ni—W/Carbon-B catalyst (Catalyst C2)

Step 1:

45.5 parts of ammonium metatungstate (AMT) $(NH_4)_6H_2W_{12}O_{40}$ was dissolved in 36 parts of fresh deionized water. 40 parts of Carbon-B was impregnated with this solution to incipient wetness. The impregnated material was left at room temperature with occasional stirring for 2 hours. It was then heated slowly at a rate of 0.3° C./min to 125° C. in an oven in air, was left at that temperature for 24 hours and was cooled slowly to room temperature in 3 hours.
Step 2:

The material from Step 1 above was impregnated to incipient wetness with a solution made up of 33.1 parts of Ni nitrate in 17.5 parts of deionized water. The impregnated material was heat-treated in the same way as in Step 1.

The resulting material is referred to as Catalyst C2. If all the AMT and Ni nitrate had decomposed to the respective oxides, Catalyst C2 would contain nominally 37% by weight W and 7.5% by weight Ni, the balance being the support carbon-B.

EXAMPLE 3

Preparation of Ni—W/Carbon-C catalyst (Catalyst C3)

Step 1:

45.5 parts of ammonium metatungstate (AMT) $(NH_4)_6H_2W_{12}O_{40}$ was dissolved in 35 parts of fresh deionized water. 40 parts of Carbon-C was impregnated with this solution to incipient wetness. The impregnated material was left at room temperature with occasional stirring for 2 hours. It was then heated slowly at a rate of 0.3° C./min to 115° C. in an oven in air, was left at that temperature for 24 hours and was cooled slowly to room temperature in 3 hours.

Step 2:

The material from Step 1 above was impregnated to incipient wetness with a solution made up of 33.1 parts of Ni nitrate in 15 parts of deionized water. The impregnated material was heat-treated in the same way as in Step 1.

The resulting material is referred to as Catalyst C3. If all the AMT and Ni nitrate had decomposed to the respective oxides, Catalyst C3 would contain nominally 37% by weight W and 7.5% by weight Ni, the balance being the support carbon-C.

EXAMPLE 4

Preparation of Ni—W/Carbon-D catalyst (Catalyst C4)

Step. 1:

45.5 parts of ammonium metatungstate (AMT) $(NH_4)_6H_2W_{12}O_{40}$ was dissolved in 34 parts of fresh deionized water. 40 parts of Carbon-D was impregnated with this solution to incipient wetness. The impregnated material was left at room temperature with occasional stirring for 2 hours. It was then heated slowly at a rate of 0.3° C./min to 115° C. in an oven in air, was left at that temperature for 24 hours and was cooled slowly to room temperature in 3 hours.

Step 2:

The material from Step 1 above was impregnated to incipient wetness with a solution made up of 33.1 parts of Ni nitrate in 14 parts of deionized water. The impregnated material was heat-treated in the same way as in Step 1.

The resulting material is referred to as Catalyst C4. If all the AMT and Ni nitrate had decomposed to the respective oxides, Catalyst C4 would contain nominally 37% by weight W and 7.5% by weight Ni, the balance being the support carbon-D.

EXAMPLE 5

Preparation of Ni—W/Carbon-E catalyst (Catalyst C5)

Step 1:

45.5 parts of ammonium metatungstate (AMT) $(NH_4)_6H_2W_{12}O_{40}$ was dissolved in 32 parts of fresh deionized water. 40 parts of Carbon-E was impregnated with this solution to incipient wetness. The impregnated material was left at room temperature with occasional stirring for 2 hours. It was then heated slowly at a rate of 0.3° C./min to 115° C. in an oven in air, was left at that temperature for 24 hours and was cooled slowly to room temperature in 3 hours.

Step 2:

The material from Step 1 above was impregnated to incipient wetness with a solution made up of 33.1 parts of Ni nitrate in 16.5 parts of deionized water. 8.0 parts of the nickel nitrate solution could not be added in the first attempt. The impregnated material was heat-treated in the same way as in Step 1.

Step 3:

To the 8.0 parts of the nickel nitrate solution remaining from step 2 above, 10 parts of deionized water was added and stirred. The dried material from step 2 above was impregnated with this resulting nickel nitrate solution to incipient wetness. The impregnated material was heat-treated in the same way as in step 1.

The resulting material is referred to as Catalyst C5. If all the AMT and Ni nitrate had decomposed to the respective oxides, Catalyst C5 would contain nominally 37% by weight W and 7.5% by weight Ni, the balance being the support carbon-E.

EVALUATION OF CATALYSTS FOR HYDRODEAROMATIZATION

Catalysts C1 through C5 were evaluated for their Hydrodesulfurization (HDS), Hydrodenitrogenation (HDN) and Hydrodearomatization (HDAr) activities in a standard hydrotreating reactor system using techniques well-known to those familiar with the art. In a typical experiment, 20 cc of the catalyst is loaded into the hydrotreating reactor of 12 mm ID and 40 cm long. After purging off of oxygen from the reactor, 100 cc/min of a sulfiding gas, 10% $H_2S$ in hydrogen, is passed over the catalyst for 15 minutes at room temperature at 1 atmosphere pressure. With the sulfiding gas flowing, the temperature of the reactor is increased at 3° C./min to 350° C. and kept at the sulfiding temperature of 350° C. for 2 hours. The temperature of the reactor is then changed to the reaction temperature, the sulfiding gas still flowing. At this point, a back pressure of about 100–400 psig is applied to the reactor and the liquid feed flow is started at the desired rate. Once the liquid had passed beyond the catalyst bed, the flow of the sulfiding gas is cut off, the flow of hydrogen started at the desired rate and the reactor pressure increased to the desired value. The actual hydrotreating reaction is considered to have started at this point in time.

After about 20 hours on stream, the liquid product samples were collected and were sparged with hydrogen gas to remove the dissolved $H_2S$ and $NH_3$ gases before they were analyzed for their sulfur, nitrogen and aromatics contents. The extent of sulfur removal (% HDS), nitrogen removal (% HDN) and aromatics saturation (% HDAr) are calculated from these analyses.

The liquid feed used for all the experiments presented here was a light atmospheric gas oil (LAGO) having the properties and composition given in Table 2. It should be mentioned here that even though LAGO was used as the feed in the examples presented here, the catalysts of the present invention are applicable for processing various hydrocarbon feed fractions ranging from naphthas to vacuum gas oils and resids.

TABLE 2

Properties of LAGO

| | |
|---|---|
| API Gravity | 32° |
| IBP (ASTM #D86) | 197° C. |
| 10% | 263° C. |
| 50% | 299° C. |
| 90% | 344° C. |
| FBP | 360° C. |
| Sulfur, wt % | 0.71 |
| Nitrogen, ppm wt. | 500 |
| Aromatics (wt %) (ASTM #5186) | 32 |

The Sulfur and Nitrogen concentrations of the feed and product samples were determined by X-ray fluorescence (XRF), ASTM# D2622 and Chemiluminescence techniques respectively. The weight percent aromatics in the feed as well as in the product samples were measured by Supercritical Fluid Chromatography (SFC), ASTM #5186. The particular reaction conditions, viz., 385° C., psig, LHSV= 2.5, and $H_2$ flow rate=4000 SCFB, employed in the present experimental runs were chosen in such a way that only partial HDAr occurs under these conditions. This helps us to compare the activities of different catalysts at identical reaction conditions in order to rank them.

Table 3 presents the results of all the catalyst evaluations for the hydroprocessing of the LAGO whose properties are given in Table 2. Presented in Table 3, in the order of the number of column, are the Run#, catalyst, catalyst description, support used, phosphorus content of the particular catalyst support in weight percent, % hydrodesulfurization (% HDS), hydrodenitrogenation (% HDN) and % hydrodearomatization (% HDAr) by SFC. The results presented are on EQUAL CATALYST VOLUME basis. The liquid hourly space velocity (LHSV), process temperature, total pressure and rate of hydrogen flow for all the experiments were 2.5, 385° C., 1500 psig and 4000 SCFB respectively.

TABLE 3

Results of Catalytic Evaluations

| Run # | Catalyst code | Catalyst description | Support | Wt. % P in support | % HDS | % HDN | % HDAr |
|---|---|---|---|---|---|---|---|
| 1 | C1 | Ni-W/Carbon-A (Comparative Example) | Carbon-A | 1.1 | 99.4 | 99.8 | 39.6 |
| 2 | C2 | Ni-W/Carbon-B | Carbon-B | 5.8 | 99.6 | 99.8 | 60.5 |
| 3 | C3 | Ni-W/Carbon-C | Carbon-C | 4.0 | NA. | NA. | 65.4 |
| 4 | C4 | Ni-W/Carbon-D | Carbon-D | 5.3 | 99.9 | 100 | 60.4 |
| 5 | C5 | Ni-W/Carbon-E | Carbon-E | 5.6 | NA. | NA. | 67.3 |

NA. = Not analyzed

The following observations/conclusions can be made from the data presented in Table 3.

(a) The novel catalysts supported on the novel "phosphorus treated carbon" supports disclosed in the present invention are highly active for the hydrodearomatization (HDAr) of hydrocarbon oils.

(b) Essentially 100% HDS and 100% HDN of the hydrocarbon oil takes place simultaneously.

What is claimed is:

1. A process for treating a charge hydrocarbon oil containing undesired aromatic components, sulfur and nitrogen compounds, which comprises:

maintaining a bed of a sulfided metal catalyst comprising 0.1 to 15% by weight of one or more metals of non-noble Group VIII selected from iron, cobalt and nickel; and at least one metal selected from 1 to 50% by weight tungsten and 1 to 20% by weight molybdenum and chromium based on the final catalyst weight, on a "phosphorus treated carbon" support, the "phosphorus treated carbon" support being characterized by (1) having been prepared by heat treating mixtures of activated carbon and phosphorus compounds at temperatures greater than 450° C., (2) the phosphorus existing in the "phosphorus treated carbon" being bound to the carbon surface predominantly as polyphosphate species characterized by peaks between −5 and −30 ppm in the solid-state magic angle spinning $^{31}P$ nuclear magnetic resonance spectrum, and (3) having a B.E.T. surface area of between 100 $m^2/g$ and 2000 $m^2/g$, a total pore volume for nitrogen of at least 0.3 ml/g, and an average pore diameter of between 12 Angstroms and 100 Angstroms;

passing a charge hydrocarbon feed in the presence of a gas selected from pure hydrogen and a gas mixture comprising greater than 60 vol. % pure hydrogen into contact with said catalyst at hydrotreating conditions of 200° C.–450° C., a pressure of 200–3000 psig, a liquid hourly space velocity of 0.1–10 LHSV and hydrogen feed rate of 200–10,000 SCFB, thereby effecting hydrodearomatization, hydrodesulfurization and hydrodenitrogenation of said charge hydrocarbon feed containing undesired aromatic components, sulfur and nitrogen compounds, and forming a product stream of hydrocarbon containing a lesser quantity of undesired aromatic components, sulfur and nitrogen compounds; and recovering said product stream of hydrocarbon containing a lesser quantity of undesired aromatic components, sulfur and nitrogen compounds.

2. The process of claim 1 wherein the non-noble Group VIII metals are present in an amount of about 2 to 12%, based on final catalyst weight.

3. The process of claim 1 wherein the Group VIB metal is tungsten and is present in an amount of 10–45 wt %, based on final catalyst weight.

4. The process of claim 1 wherein the Group VIB metal is at least one metal selected from molybdenum and chromium present in an amount of from about 5% to 18 wt %, based on final catalyst weight.

5. The process of claim 1 wherein the catalyst contains boron or fluorine along with non-noble Group VIII and Group VIB metals at 0.01 to 4% by weight.

6. The process of claim 1 wherein the hydrotreating conditions include a temperature of 300° C. to 410° C.

7. The process of claim 1 wherein the pressure is from 400 to 2500 psig.

8. The process of claim 1 wherein the B.E.T. surface area of the "phosphorus treated carbon" support is between 600 $m^2/g$ and 1800 $m^2/g$.

9. The process of claim 1 wherein the B.E.T. surface area of the "phosphorus treated carbon" support is between 1100 $m^2/g$ and 1300 $m^2/g$.

10. The process of claim 1 wherein the Total Pore Volume for nitrogen of the "phosphorus treated carbon" support is between about 0.4 and 1.2 cc/g.

11. The process of claim 1 wherein the Total Pore Volume for nitrogen of the "phosphorus treated carbon" support is between about 0.6 and 1.0 cc/g.

12. The process of claim 1 wherein the Average Pore Diameter of the "phosphorus treated carbon" support is between 16 and 50 Angstroms.

13. The process of claim 1 wherein 20–80% of the total pore volume of the "phosphorus treated carbon" support is in pores in the range of 20–500 Angstroms in diameter.

14. The process of claim 1 wherein the "phosphorus treated carbon" support contains 0.1 to 10% by weight phosphorus, measured as elemental phosphorus.

15. The process of claim 1 wherein the "phosphorus treated carbon" support contains 2.5 to 10% by weight phosphorus, measured as elemental phosphorus.

16. The process of claim 1 wherein the "phosphorus treated carbon" support is prepared from any carbon with a B.E.T. surface area of more than 100 $m^2/g$, from any raw material selected from the group consisting of coal, wood, peat, lignite, coconut shell, olive pits, synthetic polymers, coke, petroleum pitch, coal tar pitch, hydrocarbons, existing in any physical form selected from the group consisting of powder, pellets, granules, extrudates, fibers, monoliths, spheres, as precursor or starting material.

17. The process of claim 1 wherein the hydrocarbon oil is selected from the group consisting of naphthas, middle distillates, gas oils, vacuum gas oils and vacuum resids.

18. The process of claim 1 wherein the hydrocarbon oil is a naphtha or a middle distillate.

19. The process of claim 1 wherein the hydrocarbon oil feed is treated in a fixed bed reactor system, ebullated bed reactor system, fluidized bed reactor system, slurry reactor system, or in a flow through system where the catalyst as powder or granules is slurried with the hydrocarbon feed and sent through a reactor.

20. A one-step method for simultaneous hydrodesulfurization, hydrodenitrogenation and hydrodearomatization of raw oil, which comprises passing the raw hydrocarbon oil along with hydrogen ($H_2$) over a sulfided metal catalyst comprising 0.1 to 15% by weight of one or more metals of non-noble Group VIII selected from iron, cobalt and nickel; and at least one metal selected from 1 to 50% by weight tungsten and 1 to 20% by weight molybdenum or chromium based on the final catalyst weight, on a "phosphorus treated carbon" support, the "phosphorus treated carbon" support being characterized by (1) having been prepared by heat treating mixtures of activated carbon and phosphorus compounds at temperatures greater than 450° C., (2) the phosphorus existing in the "phosphorus treated carbon" being bound to the carbon surface predominantly as polyphosphate species characterized by peaks between −5 and −30 ppm in the solid-state magic angle spinning $^{31}P$ nuclear magnetic resonance spectrum, and (3) having a B.E.T. surface area of between 100 $m^2/g$ and 2000 $m^2/g$, a total pore volume for nitrogen of at least 0.3 ml/g, and an average pore diameter of between 12 Angstroms and 100 Angstroms;

passing a charge hydrocarbon feed in the presence of a gas selected from pure hydrogen and a gas mixture comprising greater than 60 vol. % pure hydrogen into contact with said catalyst at hydrotreating conditions of 200° C.–450° C., a pressure of 200–3000 psig, a liquid hourly space velocity of 0.1–10 LHSV and hydrogen feed rate of 200–10,000 SCFB, thereby effecting hydrodearomatization, hydrodesulfurization and hydrodenitrogenation of said charge hydrocarbon feed containing undesired aromatic components, sulfur and nitrogen compounds, and forming a product stream of hydrocarbon containing a lesser quantity of undesired aromatic components, sulfur and nitrogen compounds.

* * * * *